United States Patent [19]

Thoms

[11] 4,303,466

[45] Dec. 1, 1981

[54] PROCESS OF FORMING GRADED APERTURE MASKS

[75] Inventor: Roland Thoms, Mullheim, Fed. Rep. of Germany

[73] Assignee: Buckbee-Mears Company, St. Paul, Minn.

[21] Appl. No.: 161,062

[22] Filed: Jun. 19, 1980

[51] Int. Cl.³ .......................... C23F 1/02; B23P 15/00; B23P 25/06

[52] U.S. Cl. .................................... 156/626; 156/640; 156/644; 156/661.1; 156/664; 430/23

[58] Field of Search ............ 156/626, 640, 644, 661.1, 156/664; 430/22, 23, 320, 323, 329; 313/402, 403

[56] References Cited

U.S. PATENT DOCUMENTS 3,652,895 3/1972 Tsuneta et al. .................... 430/23 X
3,909,656 9/1975 Stachniak ......................... 156/644 X
3,929,532 12/1975 Kuzminski .......................... 156/644

FOREIGN PATENT DOCUMENTS 1269700 4/1972 United Kingdom ................ 156/627

*Primary Examiner*—William A. Powell
*Attorney, Agent, or Firm*—Jacobson and Johnson

[57] ABSTRACT

A process for forming openings of varying sizes in an aperture mask by determining an over-etch factor wherein the over-etch factor is determined by the time of etching through an etchant resist pattern located on opposite sides of an aperture mask material to produce an opening of predetermined size and shape followed by individually sizing the opening in the etchant resist so that etching from both sides of the aperture mask material produces etched openings of various sizes throughout the aperture with the sizing of the opening in the etchant resist characterized by having substantially constant over-etch factor even though the final openings in the aperture masks are of various sizes.

8 Claims, 12 Drawing Figures

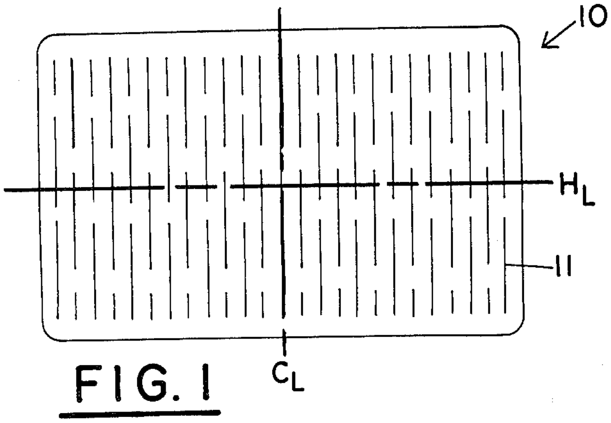
FIG. 1
FIG. 3
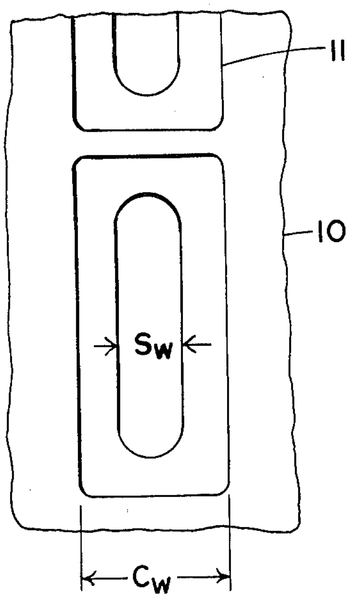
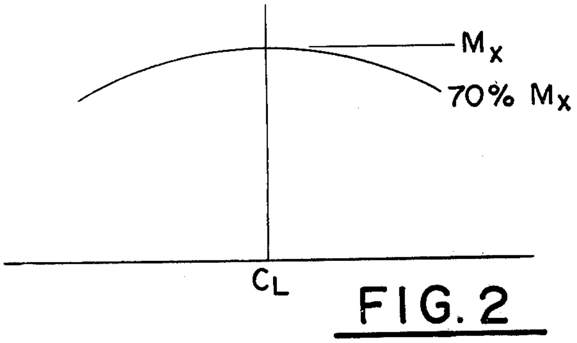
FIG. 2
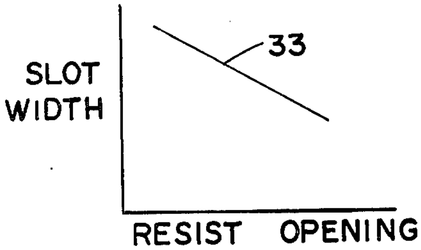
FIG. 12
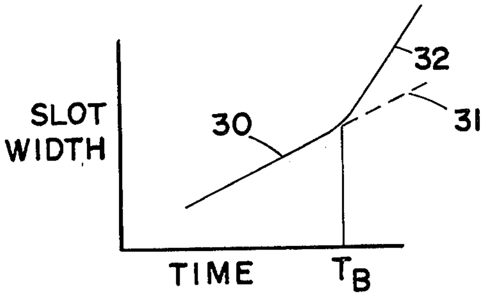
FIG. 11

PROCESS OF FORMING GRADED APERTURE MASKS

BACKGROUND OF THE INVENTION

1. Field of the Invention

This invention relates generally to television aperture masks and, more specifically, to a process for forming openings of various sizes in a television aperture mask.

2. Description of the Prior Art

The concept of aperture masks for television picture tubes is well known in the art. A typical prior art aperture mask is shown in the Braham U.S. Pat. No. 2,750,524 which shows an aperture mask having a plurality of circular openings.

The operation of such aperture masks in a television picture tube may be found in the Fyler et al U.S. Pat. No. 2,690,518 which shows a color television tube having an aperture mask located as an electron beam screen.

The prior art aperture mask openings have taken many different shapes including round as shown in the aforementioned patents or elongated as shown in the Suzuki et al U.S. Pat. No. 3,883,347. While the shape of the opening may vary in different masks, generally, all masks require the open area in the aperture mask to be graduated to accommodate the characteristics of the human eye. That is, if a television picture is to appear uniform in brightness to the human eye, it is necessary to have a television picture where the central area of the television picture is actually brighter than the peripheral area. To obtain a brighter central area the aperture masks are usually made with larger size openings in the center of the mask and smaller size openings in the periphery of the mask with openings of intermediate sizes located therebetween. As the brightness of a television picture tube is directly proportional to the open area of the aperture mask, the use of a constant density of apertures with gradually decreasing size produces an image that appears uniform in brightness to the human eye. Typically, if the brightness or open area is a maximum of 100% in the center of the aperture mask, it decreases to a minimum of 70% in the peripheral region of the aperture mask. The prior art Tsuneta et al U.S. Pat. No. 3,652,895 shows an aperture mask having a plurality of rectangular slots or circular openings with the size and pitch of the openings decreasing in size from the center of the mask to the peripheral portion of the mask. FIG. 13 of the Tsuneta et al patent also shows an alternate concept in which instead of varying the aperture size, the space between apertures is increased to thereby decrease the open area on the peripheral regions of the mask.

While the concept of decreasing open area from the center of the aperture mask to the periphery of the aperture mask is well known, the method of making an aperture mask with various size openings in which the openings are within proper tolerances has been quite difficult. The prior art Tsuneta describes the use of multiple pattern carriers that are superimposed to form a graduated pattern that is transferred onto the light-sensitive coating located on the surface of a sheet of aperture mask steel. The Tsuneta method employs the characteristics of a light source with radially decreasing intensity to develop a light-sensitive film so that the open areas in the light-sensitive film decrease radially outward.

Still another method of decreasing the size of the openings in an aperture mask is taught in the Frantzen et al U.S. Pat. No. 3,788,912. Frantzen et al teaches the nozzle position and the amount of spray can be varied to provide larger or smaller openings in selected regions of the mask. In the Frantzen technique the openings in the photoresist are of equal dimensions throughout the aperture mask with control of the aperture size obtained through controlling the etchant supply. Typical aperture masks in use today are made from a base material and have a cone side surface and a grade side surface. The cone side surface comprises a set of hollowed out recess region located on one side of the aperture mask. Located in the hollowed out recess region is an elongated or circular aperture.

To etch aperture masks with a cone side and a grade side wherein the photoresist pattern remains constant throughout the surface of the aperture mask, it is oftentimes necessary to vary also the time of etching as well as the spray direction and the amount of etchant sprayed on the aperture mask. To vary the spray time in mass production lines requires a series of multiple etching stations such as shown in Frantzen U.S. Pat. No. 3,788,912 which the number of etching stations used to determine the total etching time. However, such techniques are difficult to use and depend a great deal on the skill of the operator.

The process of the present invention in contrast eliminates the dependence on the skill of the operator by defining the openings in one side of the photoresist according to a parameter hereinafter referred to as the over-etch factor.

BRIEF SUMMARY OF THE INVENTION

Briefly, the present invention comprises the sizing of openings in the etchant resist located on one side of an aperture mask by scaling the opening in the etchant resist to maintain a substantial constant over-etch factor throughout the aperture mask even though the size of the etchant resist openings and the openings through the aperture mask vary.

BRIEF DESCRIPTION OF THE DRAWING

FIG. 1 is a front view of a television aperture mask with graded openings;

FIG. 2 is a graph of the open area in aperture mask as a function of the aperture position;

FIG. 3 is an enlarged view of an elongated aperture of the aperture mask of FIG. 1;

FIG. 11 is a graph of the rate of slot width increase as a function of etching before and after etching breakthrough; and FIG. 12 is a graph of slot width as a function of resist opening in the cone side.

DESCRIPTION OF THE PREFERRED EMBODIMENT

Figure 4:
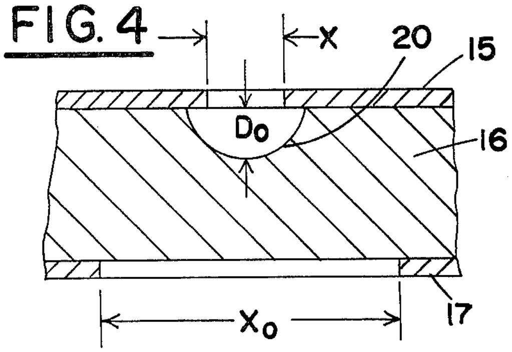
FIG. 4 is a side sectional view of a projected etched recess on the grade side of an aperture mask.

Referring to FIG. 1, reference numeral 10 designates an aperture mask having a plurality of apertures 11 therein with $C_L$ identifying a vertical center line and $H_L$ identifying a horizontal center line through aperture mask 10.

FIG. 2 is a plot of light transmission or brightness of a television picture as a function of the position of the aperture in the aperture mask. In order to accommodate the human eye the center area of the television tube which corresponds to the center area of the aperture mask has a maximum brightness characteristic which is designated by $M_X$. Note, brightness gradually decreases from a maximum of $M_X$ at the center of the mask to a maximum of approximately 70% $M_X$ at the periphery of aperture mask 10. If one has a television picture with the type of light graduation as shown in FIG. 1, the image on the television picture tube appears uniform to the human eye.

The prior art has achieved the necessary light transmission curves as indicated in FIG. 2 through two techniques, one which involves controlling the size of open area of individual slots and the second by maintaining constant size openings but decreasing the density of the slots in the outer periphery of the mask. FIG. 3 shows an enlarged cone side view of aperture mask 10 having an elongated slot 11 with slot width designated by $S_W$ and the cone width designated by $C_W$. In the present process to decrease the area for electron beam transmission through the aperture mask involves decreasing the slot width $S_W$ through control of the opening in the resist film located on the cone side of the aperture mask.

Although the prior art and the present invention both have apertures with open areas that decrease radially outward, the process and actual geometry of the cavity or recess region are different.

To illustrate the process of the present invention reference should be made to FIG. 4 which shows a sectional side view across an elongated slot of an aperture mask material 16 sandwiched between a grade side resist film 15 and a cone side etchant resist film 17. The width of opening in grade side resist film 15 is designated by X and the opening in the cone side resist film 17 is designated by $X_O$. Identified by reference numeral 20 is a solid line that represents the shape and depth of how a grade side recess would appear if etched for a given time, t. The maximum depth of the etched recess would be $D_O$ with the top width of the recess slightly larger than the dimension X. It should be pointed out that the size and shape of the etched recess would be larger if etching were allowed to continue for an additional time greater than t and smaller if etching were permitted for a time less than t.

Figure 5:
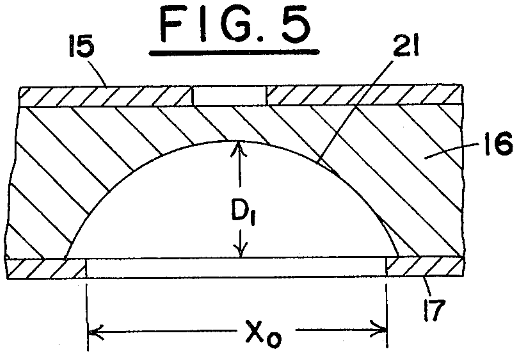
FIG. 5 is a side sectional view of a projected etched recess on the cone side of an aperture mask.

FIG. 5 shows an identical aperture mask material 16 with grade side resist film 15 and cone side resist film 17. Identified by reference numeral 21 is a solid line that represents the shape and depth of how a cone side etched recess would appear if etched for the same time, t, as the grade side recess. Note, as dimension $X_O$ is much larger than X, the size and shape of the cone side recess is much larger as is the depth of recess $D_1$. Thus, for a given time, t, the size and shape of the recess will be different even though other parameters such as etchant temperature or Baume are held constant.

Figure 6:
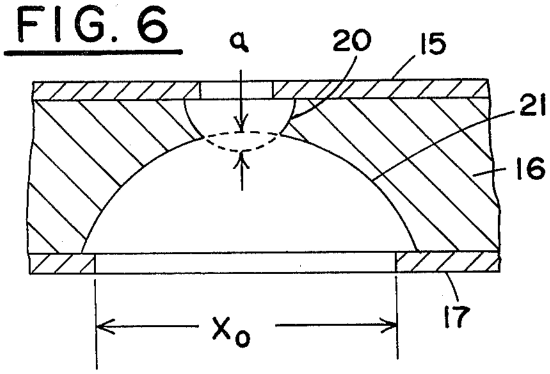
FIG. 6 is a superimposing of projected etched recess areas of FIG. 4 and FIG. 5 to define an over-etch factor.
Figure 7:
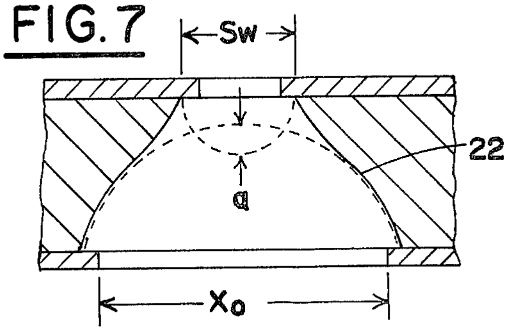
FIG. 7 is a side sectional view of an etched through aperture.

FIG. 6 is a composite drawing of the projected etched recess superimposed on aperture mask material 16. Note that the bottom of the projected recess regions extended past each other. The distance that each of the recess region extend beyond each other is designated by "a" and is herein defined as the over-etch factor. The over-etch factor is not actual over-etching but an indication of how much the projected recess region extends beyond each other. One would assume the actual etched openings through the material would be defined by the outer portions of solid lines 20 and 21. However, the actual size and shape of the openings is shown in FIG. 7. FIG. 7 shows that the actual etched openings are somewhat larger, even though the etching time, t, for both sides is the same. The enlargement is produced by the greater availability of etchant in the localized region due to flow-through of etchant after the breakthrough, with breakthrough defined as the condition when an article is etched completely through from both sides. To understand how the enlarged area occurs, reference should be made to FIG. 11 which shows slot width plotted as a function of time. The solid line 30 represents how the slot width gradually increases as a function of time. As breakthrough occurs there is steep increase in the slope indicating that the slot width is increasing much faster with time. If etching had continued without breakthrough, the increase in slot width would have continued to follow the dashed line 31. However, when breakthrough occurs, which is designated by time, $T_B$, the slot width increases at a more rapid rate with time as designated by curve 32. This phoenomenon is principally due to the circulation of fresh etchant through the opening in the aperture mask.

Figure 8:
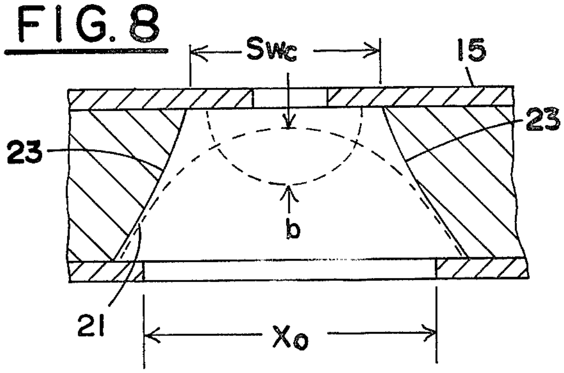
FIG. 8 is a side sectional view of an etched through aperture.

While time is shown as a variable of the curve of FIG. 11, it should be noted that other parameters such as the Baume, the temperature and the chemical composition of the etchant can have an effect on the rate of etching. These variables have been controlled or varied in the past to produce an aperture with a larger slot width $S_W$, such as shown in FIG. 8. The larger slot width would be located in the center of the aperture mask while the narrower slot width is located at the periphery of the mask. Typically, the slot width $S_{WC}$ would have been obtained by spraying more etchant into the slot of the aperture mask. The result of varying the etchant spray rate may be to produce a projected etched recess differential or etch factor which is approximately twice the projected differential etch factor "a" as shown in FIG. 6. Unfortunately, the result of varying etch factors is that it becomes very difficult to control the final slot width, $S_{WC}$ since the projected curve 21 extends substantially up to the top of resist film 15 thus producing an edge that erodes quickly. Enlarging an opening through use of more etchant becomes critically dependent on trial and error and the operator's skill, i.e., if the operator does not properly adjust the supply of etchant to the aperture slot, the width will either be too large or too small. To compound the effect, the geometry at the lip is much thinner so the etching must be controlled very closely if the final size width is to be within tolerances.

In order to control the slot width, the present process utilizes the discovery that by properly controlling the size opening placed in the cone side resist film the etch factor for each aperture is substantially equal. In physical terms this means that breakthrough in etching occurs at substantially the same time for all the apertures in the mask whether the apertures are small or large.

Figure 9:
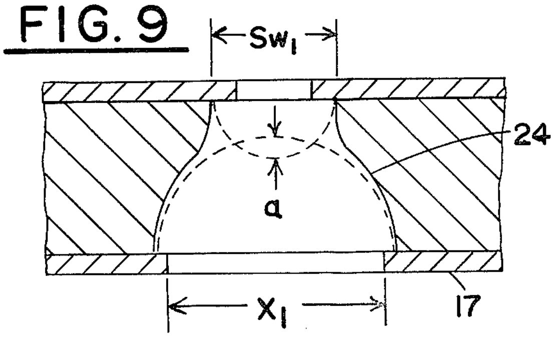
FIG. 9 is a sectional view of an aperture located at the central position of the aperture mask.
Figure 10:
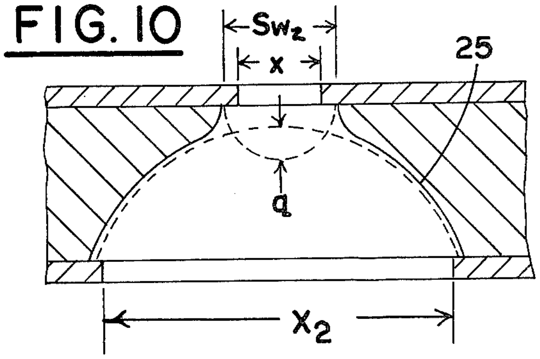
FIG. 10 is a sectional view of an aperture located at the outer periphery of an aperture mask.

FIG. 9 shows the opening in the lower resist designated by $X_1$ with the etch factor of "a". It should be noted that for purposes of understanding the invention, FIGS. 3–11 show the size of the opening in top resist layer is designated by X and the same in all views. However, in practice it may be desired to also grade the grade side resist openings. FIG. 10 illustrates a larger cone side opening $X_2$ with the same identical top opening in resist film 15. Note, the difference in the actual side wall shape 25 with the slot width, $S_{W2}$ less than the slot width $S_{W1}$.

Thus, through control of the dimensions of the opening on the cone side resist film one obtains a constant over-etch factor for each opening. The advantage of the present process is that no nozzle adjustment is required nor is there any other trial and error adjustment to obtain the final hole shape. In addition, the location of the interior lip in the opening remains relatively constant in the present process whereas in the prior art the lip thickness may increase or decrease depending on the grade side etchant pressure. Instead, one can simultaneously etch the aperture mask from both sides and be assured that at the given time, t, all the apertures will have the proper dimension.

Thus, the process of the invention involves first determining a projected etched recess pattern in one side of the mask material followed by determining a second projected etched recess region in the opposite side of the material. Next, the overlap distance, i.e., the over-etch factor, is determined for the mask. Once the over-etch factor of the mask is determined, the opening in the cone side resist layer is selected so the over-etch factor is kept constant.

Referring to FIG. 12 there is shown slot width in the aperture mask plotted as a function of the size of the resist opening on one side of the mask. The opening in the opposite side of the resist may remain constant or vary in accordance with a predetermined manner. Numeral 33 identifies a curve for a constant over-etch factor. Curve 33 may be determined experimentally. Once the relationship between slot width and resist opening is known, for a constant over-etch factor, one can go to curve 33 and determine the size of the opening to be formed in an aperture mask by locating the size of the resist opening that corresponds to the desired slot width. It should be understood that the relationship between the slot width and the resist openings will vary as other parameters are altered; however, as long as other parameters remain constant there is a definite relationship that enables one to obtain the proper slot width by merely selecting the proper size resist opening.

In a typical aperture mask it is preferred to follow certain mathematical relationship. For example, the summation of $D_0+D_1$ should preferrably be about 1.3 times the aperture mask thickness, which means that "a" is approximately 30% of the aperture mask thickness. Under these conditions one normally obtains 60% etch-through from the grade side and 70% from the cone side. However, it should be understood that the values chosen depend primarily on the type of article being made and can be varied in accordance with the type of article desired.

I claim:

1. The process of forming a plurality of openings in an aperture mask which vary in size from the center of the aperture mask to the periphery of the aperture mask comprising:

applying a layer of etchant resist to opposite surfaces of an aperture mask material, determining an over-etch factor for the aperture mask material by determining the depth of the etch from opposite surfaces of said aperture mask material;

laying out a pattern of openings in an etchant resist located on opposite surfaces of the aperture mask material wherein the size of the openings in etchant resist is determined by selecting a resist opening wherein the over-etch factor is substantially constant for etching openings in the aperture mask material; and etching the aperture mask material through the openings in the etchant resist.

2. The process of claim 1 wherein the size of the pattern opening in the etchant resist on the cone side of the material varies in accordance with the size of the opening in the aperture mask.

3. The process of claim 2 wherein the size of the pattern of opening in the etchant resist on the grade side of the mask remains constant.

4. The process of claim 3 wherein the aperture mask is etched from both sides for the same length of time.

5. The process of claim 4 wherein the etchant spray is maintained in a uniform spray pattern on opposite sides of the aperture mask.

6. The process of claim 5 wherein the aperture mask openings are elongated slots with the width of the slots varied in accordance with the relative position of the openings in the aperture mask.

7. The process of claim 6 wherein the aperture mask is simultaneously etched from both sides.

8. The process of forming openings in an aperture mask wherein the apertures are of various sizes comprising the step of:

applying a first etchant resist film on one side of a sheet of aperture mask material;

applying a second etchant resist film on the opposite side of the sheet of aperture mask material;

forming a first set of openings in said first etchant resist film to provide a region for etching the aperture mask material;

determining an over-etch factor for etching an opening in said aperture mask material; and forming a second set of openings in said second etchant resist film with the size of the opening in said second resist selected so that the over-etch factor is substantially constant throughout said aperture mask.

* * * * *